United States Patent
Gage

(10) Patent No.: US 9,876,585 B2
(45) Date of Patent: Jan. 23, 2018

(54) METHOD AND SYSTEM FOR PARTITIONING SIGNAL PROCESSING CHAINS IN A COMMUNICATION NETWORK

(71) Applicant: William Anthony Gage, Stittsville (CA)

(72) Inventor: William Anthony Gage, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/791,354

(22) Filed: Jul. 3, 2015

(65) Prior Publication Data
US 2017/0005736 A1     Jan. 5, 2017

(51) Int. Cl.
*H04B 15/00*     (2006.01)
*H04L 1/20*     (2006.01)
*H04B 7/02*     (2017.01)
*H04B 7/024*     (2017.01)

(52) U.S. Cl.
CPC ............ *H04B 15/00* (2013.01); *H04B 7/024* (2013.01); *H04L 1/20* (2013.01)

(58) Field of Classification Search
USPC ...... 455/450, 67.13, 513, 509; 370/329, 322
See application file for complete search history.

(56) References Cited

U.S. PATENT DOCUMENTS

| | | | |
|---|---|---|---|
| 7,477,609 B2* | 1/2009 | Agin | H04W 4/24 370/252 |
| 8,423,033 B1* | 4/2013 | Everson | H04L 47/782 370/322 |

(Continued)

FOREIGN PATENT DOCUMENTS

| | | |
|---|---|---|
| CN | 102647804 A | 8/2012 |
| CN | 103401929 A | 11/2013 |

(Continued)

OTHER PUBLICATIONS

English Translation of CN 103401929.*

(Continued)

*Primary Examiner* — Nay A Maung
*Assistant Examiner* — Erica Fleming-Hall

(57) ABSTRACT

A method and system for dynamically partitioning a signal processing chain of plural signal processing functions, between an edge signal processor associated with an edge node, and a common signal processor associated with a base node is provided. The partition point may be determined in accordance with at least a first parameter that is indicative of a current state of an input signal transmitted to the edge node or common equipment node, current operational or configuration state of the communication network or portion thereof, or other parameter that can impact signal transmission and/or processing. By determining the signal processing chain partition point according to a current input signal or network state, embodiments of the present disclosure are able to more efficiently manage network resources. In addition, joint processing schemes such as CoMP may be more effectively deployed.

18 Claims, 10 Drawing Sheets

(56) References Cited

U.S. PATENT DOCUMENTS

| | | | | |
|---|---|---|---|---|
| 2010/0103855 | A1* | 4/2010 | Wang | H04W 72/005 370/312 |
| 2011/0167478 | A1* | 7/2011 | Krishnaswamy | H04L 47/10 726/4 |
| 2011/0281604 | A1* | 11/2011 | Isojima | H04W 72/1252 455/509 |
| 2012/0021753 | A1* | 1/2012 | Damnjanovic | H04W 72/082 455/450 |
| 2012/0057480 | A1* | 3/2012 | Yoo | H04L 5/0023 370/252 |
| 2012/0088535 | A1* | 4/2012 | Wang | H04B 7/024 455/513 |
| 2012/0327865 | A1* | 12/2012 | Hottinen | H04W 72/02 370/329 |
| 2013/0114468 | A1* | 5/2013 | Hui | H01Q 3/2611 370/277 |
| 2014/0341144 | A1* | 11/2014 | Zhang | H04L 5/006 370/329 |
| 2015/0098415 | A1* | 4/2015 | Chen | H04L 5/0035 370/329 |

FOREIGN PATENT DOCUMENTS

| | | |
|---|---|---|
| CN | 103731884 A | 4/2014 |
| CN | 104378849 A | 2/2015 |

OTHER PUBLICATIONS

English Translation of CN 103731884.*

Uwe Dotsch et al., "Quantitative Analysis of Split Base Station Processing and Determination of Advantageous Architectures for LTE", Bell Labs Technical Journal, vol. 18, No. 1, pp. 105-128, Jun. 2011.

Hosein Nikopour and Hadi Baligh, "Sparse Code Multiple Access", 2013 IEEE 24th International Symposium on Personal, Indoor and Mobile Radio Communications: Fundamentals and PHY Track, pp. 332-336, 2013.

China Mobile Research Institute, "C-RAN: The Road Towards Green RAN", Version 2.5, pp. 1-44, Oct. 2011.

Malte Schellmann et al., "FBMC-based air interface for 5G Mobile: Challenges and proposed solutions", Jun. 2014.

3GPP TS 36.300 V12.5.0 (Mar. 2015), "Technical Specification Group Radio Access Network; Evolved Universal Terrestrial Radio Access (E-UTRA) and Evolved Universal Terrestrial Radio Access Network (E-UTRAN)", Mar. 2015.

3GPP TR 36.819 V11.2.0 (Sep. 2013), "Technical Specification Group Radio Access Network; Coordinated multi-point operation for LTE physical layer aspects", Sep. 2013.

ETSI GS NFV-SWA 001 V1.1.1 (Dec. 2014), "Network Functions Virtualisation (NFV); Virtual Network Functions Architecture", Dec. 2014.

International Search Report for PCT/CN2016/088145, dated Sep. 23, 2016.

* cited by examiner

METHOD AND SYSTEM FOR PARTITIONING SIGNAL PROCESSING CHAINS IN A COMMUNICATION NETWORK

FIELD OF THE INVENTION

The present disclosure relates to the field of telecommunications, and in particular to a method and system for partitioning signal processing chains in a wireless communication network.

BACKGROUND

Centralized radio access networks (CRAN) provide a communication infrastructure capable of supporting legacy and future wireless communication standards. While previous network architectures, such as that used for a Long Term Evolution (LTE) network, in accordance with standards set out by the $3^{rd}$ Generation Partnership Project (3GPP), each access point, such as an eNodeB, has both RF Antennas as well as a base band processing unit. Signals received by the RF antennas are processed by the base band processing unit to obtain a baseband signal. Although this provides a functioning network, it can result in an expensive build out cost. In a CRAN architecture, a network has a plurality of remote radio heads (RRH), some of the RRHs having a plurality of Radio Frequency (RF) antennas, distributed throughout a coverage area. A wireless device connects to the network by communicating with one or more RRHs. Each RRH receiving the signal then transmits the received data to a central baseband unit (BBU) which processes the RF signals. The central baseband unit typically serves a number of different RRHs. On an uplink transmission, for example, an RRH receives an RF signal from the wireless device, converts it to a baseband signal and forwards the baseband to the BBU. On a downlink transmission, the RRH receives a baseband signal from the BBU and converts it to an RF signal for transmission to the wireless device. The use of CRAN may reduce the number of BBUs needed for signal processing, in comparison to architectures where each radiohead is served by its own base band processing unit. The CRAN architecture can achieve this reduction in BBUs by pooling them between a number of RRHs. The pooling of BBU functionality across a number a RRHs can also facilitate multi-point transmission and reception processing schemes, such as CoMP (Coordinated Multi-Point), which can significantly increase spectral efficiency and reduce the effects of co-channel interference from wireless devices. However, while CRAN facilitates multi-point joint processing mechanisms by centrally processing signals thus alleviating processing resources otherwise performed proximate to the RRH, it requires the network interconnecting the BBU and RRHs maintain a very high bandwidth and low latency.

Therefore there is a need for a method and system for providing signal processing in a communication network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and system for partitioning signal processing chains in a communication network. In accordance with embodiments of the present disclosure, there is provided a method for processing an input signal in a communication network. The method includes determining a first parameter indicative of a current state of the input signal or communication network and partitioning a signal processing chain which includes plural signal processing functions, into at least a first stage of signal processing functions and a second stage of signal processing functions based on the first parameter.

In accordance with embodiments of the present invention, there is provided a method for processing an input signal in a communication network, wherein the method includes receiving instructions to process the input signal with a first stage of signal processing functions, wherein the first stage of signal processing functions is at least a portion of a signal processing chain which has been partitioned based on a first parameter indicative of a current state of the input signal or communication network. The method further includes processing the input signal with the first stage of signal processing functions to yield an intermediate stream and transmitting the intermediate signal.

In accordance with embodiments of the present disclosure, there is provided a communication network including at least one edge node and a base node coupled to the at least one edge node. The communication network further includes a processor configured to partition a signal processing chain which includes plural signal processing functions, into a first stage of signal processing functions and a second stage of signal processing functions according to a first parameter indicative of a current state of an input signal or communication network, wherein the first stage signal processing functions is performed by one of the at least one edge node or the base node receiving the input signal and thereby yielding an intermediate stream, and the second stage of signal processing functions is performed by the other of the at least one edge node or the base node on the intermediate stream.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
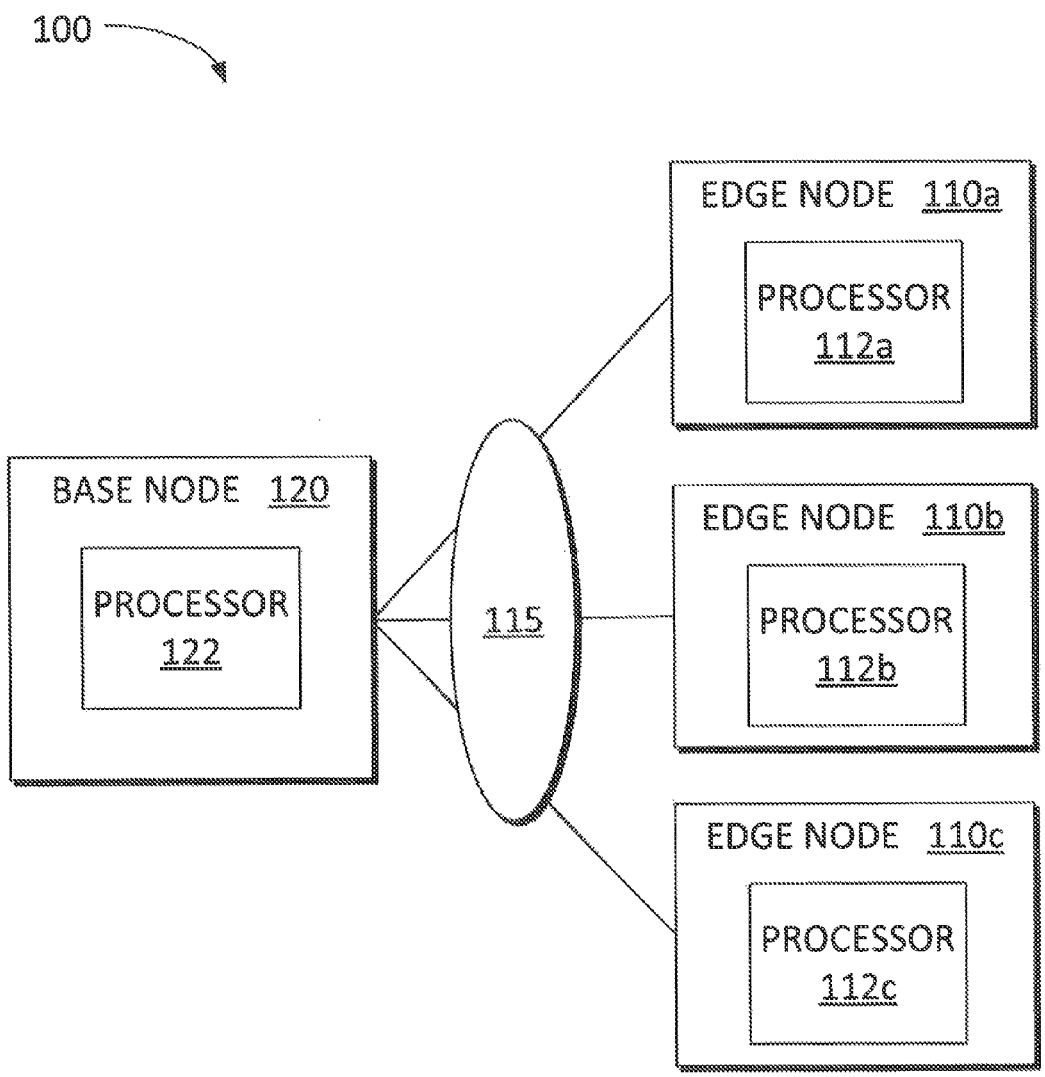
FIG. 1 illustrates a communication network to which embodiments of the present invention can be applied.

As used herein, the term "node" is used to define a connection point, a redistribution point or an endpoint. A node can be an electronic device that is attached to a network and is capable of creating, receiving or transmitting information over a communication channel or link. In general, a node has programmed or engineered capability to recognize and process or forward transmissions to other nodes.

As used herein, the term "base node" is used to define a node within a communication network which can be defined as a baseband unit pool, radio network controller, base station controller or the like. In some embodiments, a base node can be a common equipment node.

As used herein, the term "edge node" is used to define a node within a communication network which can be defined as an access point, base station, evolved Node-B (eNB), Node B, transmission point, reception point, remote radio head or the like. In some embodiments, an edge node can be a radio edge node.

As used herein, the term "about" refers to a +/−10% variation from the nominal value. It is to be understood that such a variation is always included in a given value provided herein, whether or not it is specifically referred to.

CRAN requires an infrastructure which enables the execution of multi-point or joint processing schemes such as CoMP. Multi-point operations can improve the quality of a signal received from a wireless device by managing RF transmissions through two or more radio edge nodes capable of serving the device. In CRAN architectures, a number of radio edge nodes are typically coupled to a common equipment node through a fronthaul network. The fronthaul network may comprise a combination of wired links, such as optical links, or high capacity wireless links deployed in some combination of point-to-point, ring, tree, and/or mesh topology. The fronthaul network carries data between the common equipment node and various radio edge nodes.

There are a number of drawbacks associated with current signal processing schemes. In distributed RAN, for example, all of the signal processing is performed at an edge signal processor located near the radio edge node. While this can minimize subsequent transmission demands across fronthaul and/or backhaul networks, the localization of processing resources at the edge signal processor makes it extremely difficult to implement multi-point joint processing mechanisms due to, for example, strict timing tolerances required. Conversely, in centralized RAN, substantially all of the signal processing is performed at a common equipment node. While this facilitates multi-point joint processing mechanisms by contemporaneously processing information received from multiple radio edge nodes, it requires the fronthaul network provide very high bandwidth and low latency. Furthermore, because fronthaul bandwidth requirements are load independent under a centralized RAN configuration (i.e. the same fronthaul bandwidth is required for unloaded/loaded cells), the opportunity cost for transmissions is not efficiently utilized. Hybrid RAN architectures attempt to provide a compromise between the centralized RAN and distributed RAN schemes. In a hybrid RAN architecture, some of the signal processing functions are performed by edge signal processor near the radio edge node. Other signal processing functions are performed by common signal processors at or on the way towards the common equipment node. However for hybrid RAN, the allocation and placement of these signal processing functions is predetermined during the network design phase. This selection of placement and allocation can be based on cost and availability of functionality. For example, it may be based on predetermined fronthaul network facilities and capacities. Moreover, these static hybrid RAN configurations reduce the effectiveness of CoMP and other multi-point transmission and reception joint processing schemes. Accordingly, a more versatile signal processing scheme for wireless communication, which can integrate advantages of both distributed RAN and centralized RAN is desirable.

Embodiments of the present disclosure are directed towards a method and system for dynamically partitioning a signal processing chain which includes plural signal processing functions, such that the signal processing functions can be distributed between one or more nodes. For example, the partitioning of the signal processing chain can provide for the division of the signal processing functions between an edge node and a base node. However in some embodiments, partitioning of the signal processing chain may result in the division of the signal processing functions between an edge node, a base node and an intermediate node between the edge node and the base node. In other embodiments, the signal processing functions may be solely performed at the edge node or base node. The partitioning of the signal processing functions among the nodes participating in the signal processing chain, can be determined in accordance with at least a first parameter that is indicative of a current state of an input signal transmitted to the edge node or base node, current operational or configuration state of the communication network or portion thereof, or other parameter that can impact signal transmission and/or processing. In certain embodiments, the one or more partition points can be selected to accordingly manage transmission resources of an intermediate network communicatively coupling the edge node and base node. For example, in an uplink transmission, a reception stream may comprise an RF signal transmitted from a wireless device to the edge node, where a first stage of signal processing functions is performed at the edge node to yield an intermediate stream; the intermediate stream is then transmitted across the intermediate network to the base node where a second stage of signal processing functions is performed to yield a processed stream. By determining the signal processing chain partition point according to a current stream or network state, embodiments of the present disclosure are able to more efficiently manage network resources. In addition, joint transmission and reception schemes such as CoMP may be more effectively deployed.

Referring to FIG. 1, there is shown an embodiment of a communication network 100 to which aspects of the present disclosure may apply. The communication network 100 comprises a base node 120 communicatively coupled to edge nodes 110*a*, 110*b*, 110*c* via a intermediate network 115. Each edge node 110*a*, 110*b*, 110*c* is associated with a respective edge node signal processor 112*a*, 112*b*, 12*c*, that may perform signal processing functions on streams received from the base node 120, other edge nodes or wireless devices (not shown). The base node 120 comprises a base node signal processor 122 that may also perform signal processing functions on streams received from the edge nodes 110a, 110b, 110c, other base nodes or nodes (not shown), and a scheduler 124 for scheduling transmissions, such as between a wireless device (not shown) and edge nodes 110a, 110b, 110c, or between edge nodes 110a, 110b, 110c and base node 120.

In addition, the edge nodes and the base node are configured with sufficient hardware, firmware and software to perform their required functions based on the design of the communication network and their location therein. In addition, in some embodiments, edge nodes of a communication network may be configured in different ways, for example with different levels of functionality provided. For example, a first edge node may have sufficient functionality to provide typical edge node operational functionality, while a proximate edge node may have enhanced functionality in order to provide an increased level of functionality at that particular edge node. The enhanced functionality of the proximate edge node may be required in certain operational conditions and this functionality may be accessed by proximate edge nodes, other nodes or wireless devices for example on an as needed basis.

In addition according to embodiments, edge nodes and/or base nodes can be configured with sufficient functionality in order to enable instantiation of signal processing functions on an as-needed basis according to current processing requirements. These may, for example, be realized as virtual network functions (VNFs) within a Network Function Virtualization (NFV) framework. NFV and virtual network functions architecture is described in ETSI GS NFV-SWA 001, for example.

In addition, while FIG. 1 depicts a particular embodiment of the communications network, it may comprise a different architecture and different components in other embodiments. For example, in one embodiment that will be described further below, the communications network may comprise a radio access cluster in a wireless telecommunications network, where base node comprises a common equipment node, and edge nodes comprise radio edge nodes. In other embodiments (not shown), the base node may comprise a gateway node, and edge nodes may comprise base stations, wherein the gateway nodes are coupled to the base stations via a backhaul network. These and other embodiments are all contemplated within the present disclosure.

Figure 2A:
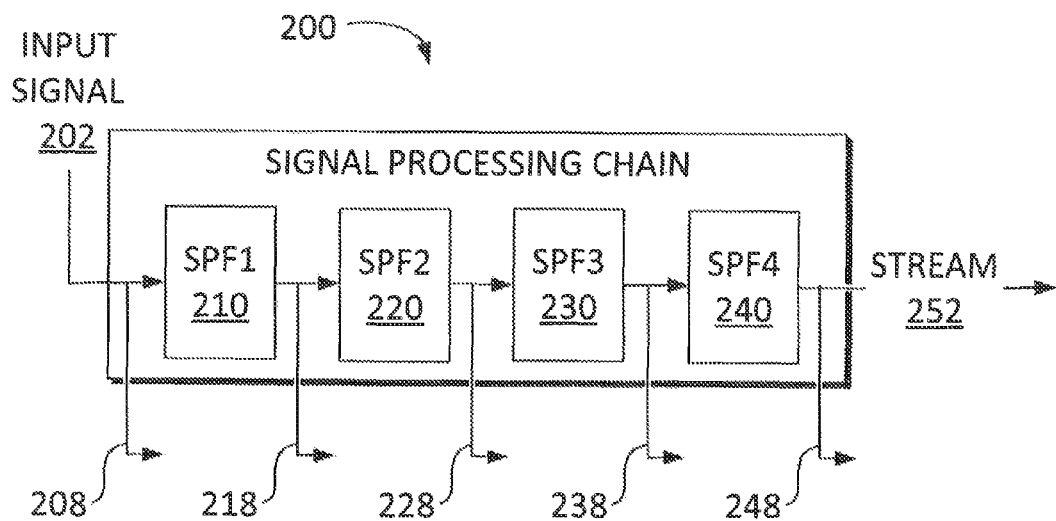
FIG. 2A illustrates a signal processing chain in accordance with embodiments of the present invention.

Referring to FIG. 2A, there is shown an embodiment of a signal processing chain 200, indicating a sequence of individual signal processing functions 210, 220, 230, 240 that may be performed on an input signal 202 to obtain a fully processed signal. Each or any of these functions can be carried out by the base node 120 and/or the edge nodes 110a, 110 b, 110c of the communications network 100. For example, the input signal 202 may comprise an RF signal from a wireless device, and signal processing functions 210, 220, 230, 240 may comprise functions for demodulating the RF signal to a baseband signal, and subsequent conversion to an output stream 252 for relaying to a network gateway (not shown). In another embodiment, the signal 202 may be received from the network gateway, to which plural signal processing functions are applied resulting in an output stream 252 for transmission as an RF signal to the wireless device.

As shown in FIG. 2A, signal processing chain 200 comprises a first signal processing function (SPF 1) 210, a second signal processing function (SPF 2) 220, a third signal processing function (SPF 3) 230, and a fourth signal processing function (SPF 4) 240 that are applied to the input signal 202. While these signal processing functions may be performed entirely by the base node 120, or one or more edge nodes 110a, 110b, 110c, these signal processing functions may also be shared between base node 120 and at least one of the edge nodes 110a, 110b, 110c to co-operatively yield the data signal 252. Accordingly, partition points 208, 218, 228, 238, 248 are dispersed around signal processing functions 210, 220, 230, 240 in order to separate the functions into a first stage of signal processing functions and second stage of signal processing functions. The first stage of signal processing may then be deployed on one of the base node 120 or edge nodes 110a, 110b, 110c, and the second stage of signal processing may be deployed on the other of the base node 120 or edge nodes 110a, 110b, 110c. For example, in an uplink transmission, partition point 218 may be selected such that the first stage of signal processing comprises a first signal processing function 210 that is deployed on at least one edge node 110a, 110b, 110c, and the second stage of signal processing comprises the second, third, and fourth signal processing functions 220, 230, 240 that are deployed on the base node 120. As another uplink transmission example, partition point 248 may be selected such that the first stage signal processing comprises all signal processing functions 210, 220, 230, 240 which are deployed on at least one edge node 110a, 110b, 110c, and there is no second stage of signal processing being performed at the base node 120.

It will be readily understood that while the signal processing chain illustrated in FIG. 2A, includes four signal processing functions, a signal processing chain may include more or less than four signal processing functions. Moreover, adjacent partition points may be positioned such that plural signal processing functions are applied between these partition points. As such, the signal processing chain illustrated in FIG. 2A is merely for simplicity and may vary in many ways depending on a variety of factors including network topology, specific signal processing functions required and the like.

Still referring to FIG. 2A, an intermediate stream is described as the input signal 202 having first stage signal processing functions performed thereon, according to a particular partition point 208, 218, 228, 238, 248. For example, if partition point 228 is selected, the intermediate stream comprises the input signal 202 having the first and second signal processing functions 210, 220 performed thereon. As another example, if partition point 248 is selected, then the intermediate stream comprises the input signal 202 having the first, second, third, and fourth signal processing functions 210, 220, 230, 240 performed thereon. Accordingly, the intermediate stream represents the form of signal that may be transmitted from the edge node 110a, 110b or 110c to the base node 120 if the stream is an uplink stream and vice versa if the stream is a downlink stream. Once received, second stage processing functions may be applied (if needed) to complete processing of the stream and yield the data signal 252.

The bandwidth required for the transmission of the intermediate stream between the edge node and the base node or vice versa varies according to the selection of the partition point 208, 218, 228, 238, 248. For example, the bandwidth required becomes increasingly lower (uplink case) and increasingly greater (downlink case) upon successive application of each individual signal processing function 210, 220, 230, 240. It will be readily understood that the setting of partition points in uplink and downlink directions can be done independently. Accordingly, selection of the partition point 208, 218, 228, 238, 248 not only separates processing functions into first and second signal processing stages for deployment onto the base node 120 and edge nodes 110a, 110b, 110c, it also determines the relative bandwidth of the intermediate stream, which may then be transmitted between the base node 120 and edge nodes 110a, 110b, 110c or vice versa during communication. Therefore, in certain embodiments of the present disclosure as will be discussed in further detail below, the partition point 208, 218, 228, 238, 248 may be opportunistically selected as to alleviate, or take advantage of, current transmission resources and/or conditions between the base node 120 and edge nodes 110a, 110b, 110c of the communication network.

Figure 2B:
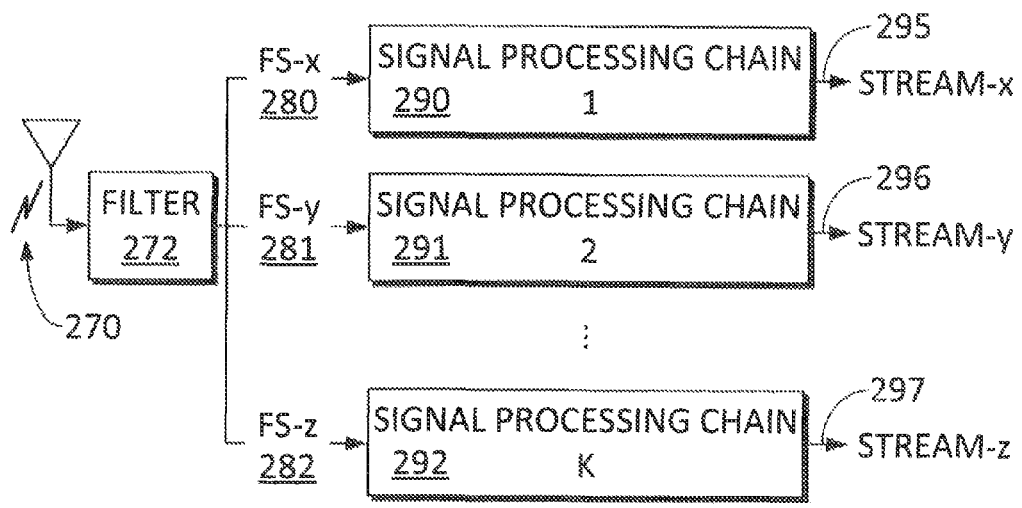
FIG. 2B illustrates plural signal processing chains in an uplink direction which are determined for plural filtered input signals in accordance with embodiments of the present invention.

In some embodiments, a particular input signal may include a plurality of interleaved signals and upon filtering of this input signal into a plurality of filtered input signals, a suitable signal processing chain for each filtered input signal can be determined. These signal processing chains can be subsequently partitioned according to embodiments of the present invention. For example, the radio channel model may enable the allocation of radio resources in at least two dimensions, for example time and frequency. Each time/frequency slice is independent of the other slices, for example, based on different waveforms, different transmit time intervals (TTI), different sub-carrier spacings and the like. Furthermore, multi-carrier filtering mechanisms can be used to isolate the radio resources used in each frequency slice thereby allowing for different signal processing chains to be applied to each time/frequency slice. FIG. 2B illustrates the separation of an input signal into separate filtered input signals, wherein each is assigned a respective signal processing chain, in accordance with embodiments of the present invention. At least one wireless device transmits an RF signal as input signal 270 which is received at a filter 272. The filter is configured to separate the input signal into filtered signal-x 280, filtered signal-y 281 and filtered signal-z 282. Based on characteristics of the particular filtered signal 280, 281, 282, a signal processing chain 290, 291 and 292 is determined. These signal processing chains can be the same or different and are directly related to the characteristics of the filtered input signal associated therewith. A respective signal processing chain is determined in order to process the particular filtered input signal to output an associated stream 295, 296, 297, which is compatible for transmission with the subsequent network component, for example a backhaul network.

According to embodiments, the collection of the necessary information for determining a partition point as well as determining the partitioning point associated with the signal processing chain, can be performed by a computing device or processor or cooperative plural computing devices or processors, which are located at the edge node, the base node or other node or nodes within the communication network that is provided with the appropriate functionality to perform this evaluation. Accordingly the evaluation of the necessary information and the determining of the partition point can be performed at a variety of one or more locations and should not be limited to a particular location.

Figure 3:
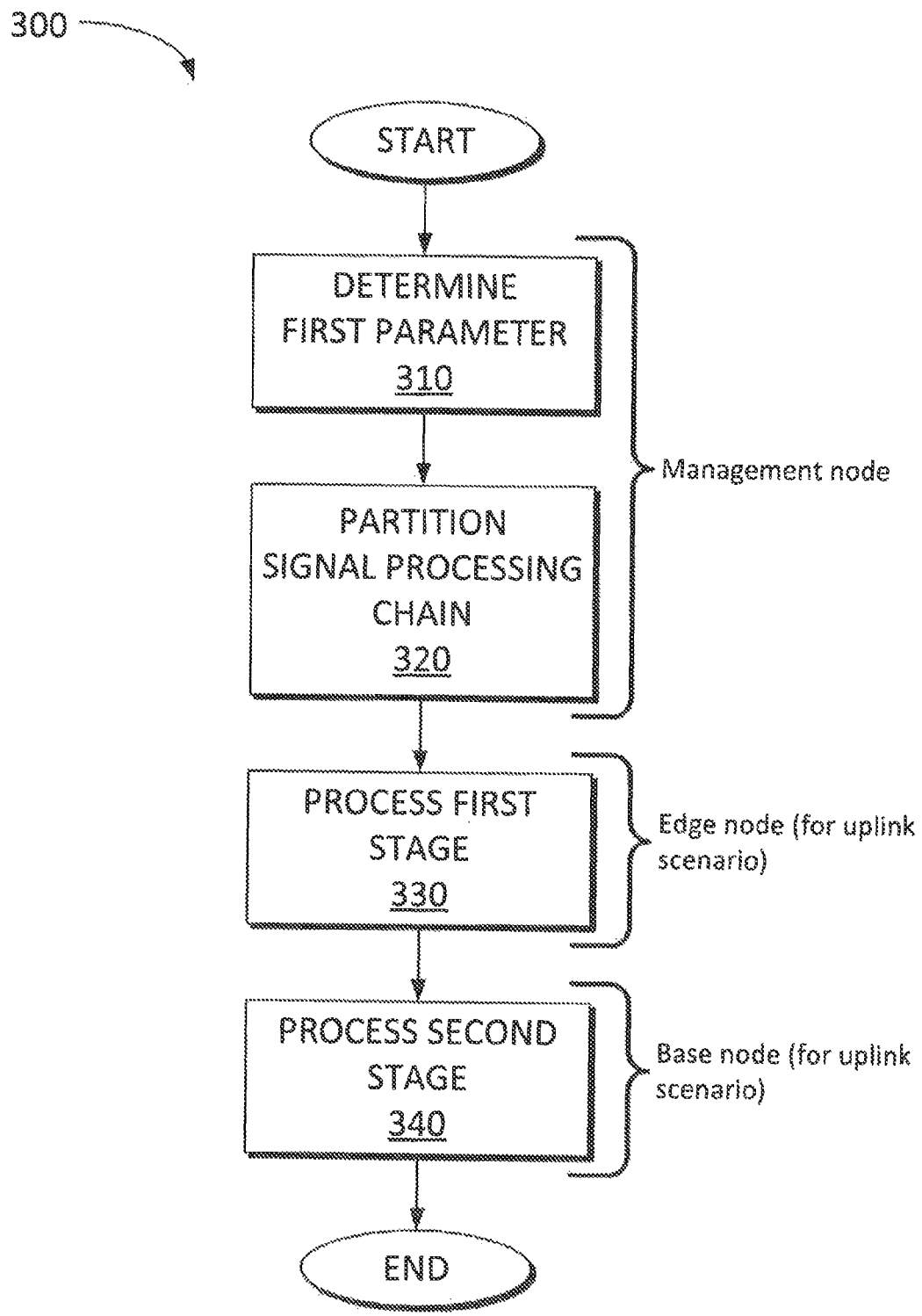
FIG. 3 illustrates a flow chart illustrating a method for determination of a first stage of signal processing functions and second stage of signal processing function according to embodiments of the present invention.

Referring to FIG. 3, there is shown a flow chart illustrating an embodiment of a method 300 for processing an input signal 202 with a base node 120 and/or at least an edge node 110a, 110b or 110c of the communication network of FIG. 1, according to the signal processing chain 200 of FIG. 2A.

At step 310, a first parameter indicative of a current state of the stream, or a current state of the communication network, is determined. The first parameter may comprise, for example, the signal-to-noise ratio (SNR) or signal-to-interference plus noise ratio (SINR) of the stream, the signal processing load of the base node signal processor or edge node signal processors, the signal processing capabilities of the base node signal processor or edge node signal processor, transmission bandwidth capacity between the base node and the edge nodes as defined by the capacity of the intermediate network therebetween, latency between the base node and the edge nodes as defined by the capacity of the intermediate network therebetween, or other parameter.

At step 320, signal processing functions 210, 220, 230, and 240 of the signal processing chain are partitioned into a first stage of signal processing functions and a second stage of signal processing functions according to the determined first parameter. A partition point 208, 218, 228, 238, 248 may be selected as to opportunistically take advantage of, or alleviate current conditions of the stream or aspects of the communication network.

For example, if the input signal comprises an uplink transmission from a wireless device to an edge node, and the first parameter comprises the SINR of the input signal and is determined to be relatively low, this may suggest that the wireless device may benefit from a joint reception processing scheme such as CoMP. Accordingly, the first stage of signal processing functions may include a relatively few number of signal processing functions and as such partition point 208, 218, or 228 in the signal processing chain may be selected. This selection may help alleviate the requirements of processing resources of the edge nodes, while also more effectively deploying a joint processing scheme.

As another example, if the first parameter comprises the transmission bandwidth capacity of the intermediate network between the base node and the edge nodes, and is determined to be relatively low, the first stage of signal processing functions may include plural signal processing functions and as such partition point 228, 238, or 248 in the signal processing chain may be selected. This selection may result in the intermediate stream, which is to be transmitted from the edge node and base node, requiring a relatively low bandwidth, thereby alleviating or reducing potential congestion in the intermediate network. Other examples of partitioning the signal processing chains according to a first parameter or plural parameters will be further discussed below.

According to embodiments, determining the first parameter 310 and partitioning the signal processing chain 320 may be performed by a first node, for example a management node. Subsequent to this partitioning of the signal processing chain, the first node transmits information to the base node or at least one edge node. This transmitted information is indicative of the signal processing functions to be performed on the input signal at that particular node, for example the first stage of signal processing functions. The first node can also transmit information to the other of the base node or at least one edge node, wherein this transmitted information is indicative of the signal processing functions to be performed thereby, for example the second stage of signal processing functions.

At step 330, the input signal is processed with the first stage of signal processing functions at one of the base node, or at least one edge node to yield an intermediate stream. For example, if the input signal is obtained from an uplink transmission from a wireless device to an edge node and partition point 228 is selected, the first stage of processing functions comprises signal processing functions 210 and 220, which are deployed on at least one of the edge nodes. The resulting intermediate stream may then be transmitted to the base node.

At step 340, the intermediate stream is processed with the second stage of signal processing functions at the other of the base node or the at least one edge node. Following the above example, if partition point 228 is selected and the intermediate stream is an uplink stream, the second stage of signal processing functions which comprises signal processing functions 230 and 240 are deployed on the base node in order to complete the signal processing chain 200 and convert the intermediate stream into the data stream 252.

In certain embodiments, by dynamically partitioning signal processing chain functions 210, 220, 230, and 240, and allocating them between the base node and edge nodes, efficiency of the communication network may be improved. For example, signal processing chains may be partitioned to more effectively enable co-ordinated multi-point joint processing schemes for wireless devices currently experiencing low SINR, and thereby improve the signal quality for the device user. For wireless devices experiencing high SINR, multi-point joint processing schemes may provide little improvement to the signal quality for the device user and may be deemed unnecessary, resulting in a different partitioning of the signal processing chain. As another example, when communications network comprises an intermediate network communicatively coupling the base node to the edge nodes, the partition point 208, 218, 228, 238, and 248 may be dynamically selected as to minimize the resource requirements of the intermediate network by selectively allocating or pooling signal processing functions between the base node and the edge nodes.

In some embodiments, partitioning of the signal processing chain can result in the selection of plural partition points. For example, if two partition points are determined, the signal processing chain can be separated into a first stage of signal processing functions, second stage of signal processing functions and a third stage of signal processing functions. In this example, the first stage may be performed at an edge node, the third stage may be performed at the base node and the second stage may be performed by another node in the communication network.

While the above embodiments illustrate certain examples of the first parameter, and how signal processing chains may be accordingly partitioned, the choice of the first parameter may vary in other embodiments. The following sections highlight different features which the first parameter may comprise, along with how signal processing chains may be partitioned in view of the determined first parameter.

Furthermore, determining the partition point in the signal processing chain may involve the use of plural parameters. In some embodiments, when plural parameters are used, these parameters may be accounted for in a serial fashion, namely, that an initial partition point is selected and subsequently revised after consideration of a second parameter. In other embodiments, when plural parameters are used, these parameters may be accounted for by use of an equation which includes weighting functions applied to each of the parameters. These weighting functions can be dependent upon the relative importance of the mitigation of the problem or problems involved with the parameter to which is it assigned. The weighting functions may be dependent on one or more other factors, for example, type of device being served, importance of the communication and the like. The consideration of two or more different parameters may provide greater flexibility and result in a better strategy for the placement of signal processing functions to reduce network operating costs.

For example, the first parameter may be indicative of the SINR of the input signal, for example SINR in an input signal received at an edge node from a wireless device. The second parameter may be indicative of traffic load on the intermediate network between the edge node and base node. If the SINR of the input signal is determined to be relatively low, a multi-point reception scheme may be beneficial, and thus a scheme having the majority of signal processing functions performed at the base node may be implemented. Also, if the traffic load is relatively low, the base node may perform the majority of signal processing functions without bandwidth concerns related to the intermediate stream. In this instance, as both the first and second parameters are suitable for the majority of signal processing functions to be performed at the base node, partition 208 illustrated in FIG. 2A may be selected based on the first and second parameters, such that signal processing functions 210, 220, 230, 240 are entirely allocated to the base node 120. However in the instance of where the first parameter leads to selection of partition point 208 and the second parameter leads to the selection of partition point 238, the importance of each of the parameters can provide a means for the selection of the partition point to be used. As noted above, the importance of the parameter can be defined by a weighting function that is associated therewith for determination of the partition point.

In some embodiments, the first parameter is indicative of the Signal to Noise Ratio (SNR)/Signal to Interference plus Noise Ratio (SINR) of the signal experienced for example, by a wireless device. Wireless devices experiencing low SNR/SINR may benefit from co-coordinated joint processing such as CoMP to improve signal quality. Because co-coordinated joint processing schemes require significant transmission bandwidth between the base node and edge nodes (fir example, via an intermediate network such as a fronthaul network (described later)), the partitioning of signal processing functions 210, 220, 230, 240 may be performed in such a way as to alleviate transmission demands so that a joint processing scheme may be more effectively employed.

First and second SNR/SINR thresholds may be chosen such that when the SNR/SINR of the stream is within certain ranges of these thresholds, partition point 208, 218, 228, 238, and 248 may be appropriately selected as to provide an intermediate stream which meets transmission bandwidth requirements. For example, if the SNR/SINR of input signal 202 from an uplink transmission is below a first SNR/SINR threshold, the second stage of signal processing functions deployed on the base node 120 comprises a larger proportion of the signal processing functions than the first stage of signal processing functions deployed on at least one edge node 110a, 110b, 110c. If the SNR/SINR of input signal 202 is above a second SNR/SINR threshold, the first stage of processing functions comprises a larger proportion of the signal processing functions than the second stage of signal processing functions. In this way, partition point 208, 218, 228, 238, and 248 may be appropriately selected as to alleviate transmission demands on the communication network, in view of more effectively employing a joint processing scheme.

In some embodiments, the first parameter is indicative of the traffic load on the intermediate network between the base node and edge nodes of the communication network, which can be representative of the available capacity. The intermediate network communicatively couples the base node to the edge nodes, such as a fronthaul or backhaul network, according to specific embodiments. A heavy traffic load may result in transmission delays and/or transmission errors, while a light traffic load may indicate that a higher transmission bandwidth may be used. Accordingly the partitioning of signal processing functions 210, 220, 230, 240 may be performed in such a way as to alleviate or take advantage of current traffic loads in the communication network.

A traffic threshold may be chosen such that when the traffic load is above or below this threshold, partition point 208, 218, 228, 238, and 248 is appropriately selected as to provide an intermediate stream requiring an appropriate bandwidth in view of the current transmission capacity of the transmission channel. For example, in an uplink direction, if the traffic load is below the traffic threshold, the second stage of signal processing functions deployed on the base node 120 comprises a larger proportion of the signal processing functions than the first stage of signal processing functions deployed on at least one edge node 110a, 110b, 110c. If the traffic load is at or above the traffic threshold, the first stage of signal processing functions comprises a larger proportion of the signal processing functions than the second stage of signal processing functions. In this way, partition point 208, 218, 228, 238, and 248 may be appropriately selected as to alleviate or take advantage of current traffic loads in the communications network.

In some embodiments, the first parameter is indicative of the signal processing load of the base node signal processor 122 at the base node 120, or edge node signal processors 112a, 112b and 112c at the edge nodes 110a, 110b, 110c, respectively. For example, the edge node signal processors may currently have limited processing capacity due to other processing demands. If the burden of executing one or more of the additional signal processing functions 210, 220, 230, 240 would exceed that capacity of the particular edge node signal processor, the signal processing chain may be partitioned as to allocate some or all of the signal processing functions to the base node in order to perform signal processing.

By way of example, edge node 110a may receive an input signal 202 from a wireless device; while it may currently possess sufficient processing capacity to perform first signal processing function 210, it does not have sufficient capacity to perform the second, third, and fourth signal processing functions 220, 230 and 240, respectively. Accordingly, partition point 218 is selected as to allocate first signal processing function 210 to edge node 110a, and second, third, and fourth signal processing functions 220, 230 and 240 to base node 120. In this way, signal processing functions 210, 220, 230, 240 may be allocated between the base node 120 and edge node 110a according to their current processing capacities.

In some embodiments, the first parameter is indicative of the signal processing capability of the base node signal processor 122 at the base node 120, or edge node signal processors 112a, 112b, 112c at the edge nodes 110a, 110b, 110c, respectively. In some embodiments, the input signal 202 may comprise a wide variety of waveforms of differing complexities, wherein some processors, for example edge node signal processors, may not be deployed with some or all of the necessary signal processing functions for a particular waveform. Alternatively, some edge node signal processors may not have the processing power necessary to perform the required signal processing functions in an efficient manner. Accordingly signal processing functions 210, 220, 230, 240 may be partitioned according to which of the base node or edge nodes possess the required signal processing functions for a particular input signal 202. Furthermore this partitioning to particular nodes may be performed provided that the respective node or nodes have the required processing capacity.

For example, base node 120 may be deployed with signal processing functions 210, 220, 230, 240, while edge node 110a may only by deployed with first signal processing function 210 to reduce network implementation costs. Thus in an uplink transmission, partition point 218 may be selected as to allocate first signal processing function 210 to edge node 110a based on its limited signal processing capability, while signal processing functions 220, 230, 240 may be allocated to base node 120. In this way signal processing functions 210, 220, 230, 240 may be allocated between the base node 120 and edge node 110a according to the individual signal processing functions available and deployed on their respective platforms.

In some embodiments, proximate edge nodes may be deployed with varying signal processing functionality, which may provide for varying partition point selection depending on the edge node being used. For example, if a wireless device is communicatively linked to two different edge nodes and these edge nodes have varying signal processing functionality, both of these edge nodes may be evaluated for partition point selection in order to determine which edge node would be beneficial for use during communication. This selection of edge node can be based on the respective partition point determined for each edge node, weighted against the respective impact on the communication network and the edge node and base node. If a wireless device is communicatively linked to different edge nodes for multipoint joint processing and these edge nodes have varying signal processing functionality or varying signal processing loads, the selected partition point may be different for each of the edge nodes.

In some embodiments, this may assist in reducing overall network implementation costs by deploying specialized or intensive signal processing functions on the base node or a common equipment node, instead of being deployed over several edge nodes or radio edge nodes. The reduction of overall network implementation costs may also be mitigated by deploying specialized or intensive signal processing functions on selected edge nodes, for example proximate edge nodes which may service the same wireless device.

In some embodiments, the signal processing method 300 described above and shown in FIG. 3 further comprises repartitioning the signal processing chain in view of the first parameter or another parameter or a plurality of parameters changing. For example, if the first parameter comprises the SINR of input uplink signal 202, when a partition point was previously selected wherein the edge node performs the majority of signal processing functions, a subsequent decrease in the SINR may encourage altering uplink processing towards a multipoint joint reception scheme to improve signal quality. Accordingly the signal processing chain may be repartitioned wherein the base node performs the majority of signal processing functions to more effectively deploy a multipoint joint reception scheme such as CoMP.

According to embodiments of the present invention, repartitioning of a signal processing chain can occur based on a change in a currently evaluated parameter, for example a change one or more of SINR experienced by the device, change in traffic demands of the intermediate network, change in signal processing demands on the base node signal processor or edge node signal processor(s) and change in edge signal processor capabilities or functionalities. Furthermore, repartitioning of a signal processing chain may also result from the arrival of a new input signal or stream, departure of a stream, equipment failure, edge node processor change due to handover of a wireless device from a first edge node to a second edge node or other change in the communication network operation or input signal. It would be readily appreciated that some of the above noted reasons for repartitioning of a signal processing chain are dependent upon each other or a particular change in a first aspect can result in a change in another parameter. For example, an equipment failure may result in an increase in the signal processing demands on the base node signal processor or edge node signal processor.

In such embodiments, the method 300 shown in FIG. 3 may further comprise monitoring a second parameter indicative of the current state of the input signal 202 or the communications network or intermediate network and if the second parameter changes: repartitioning the signal processing chain including signal processing functions 210, 220, 230, 240 into a modified first stage of signal processing functions and a modified second stage of signal processing functions according to the second parameter. The input signal 202 would then be processed with the modified first stage of signal processing functions at one of the base node 120 or the at least one edge node 110a, 110b, 110c to yield a modified intermediate stream; and processing the modified intermediate stream with the modified second stage of signal processing functions at the other of the base node or the at least one edge node. In certain embodiments when at least two edge nodes 110a, 110b, 110c are performing a first or second stage of signal processing functions, the partitioning point selected for a first edge node may be different from the partitioning point selected for a second edge node. In certain embodiments, the second parameter above may be the same parameter as the first parameter.

According to embodiments, the repartitioning or reassessment of the partition point can be performed when the parameter under assessment has changed by a predetermined amount, for example each parameter may have an associated threshold for change. The predetermined amount can be parameter dependent, for example a small change in one parameter may necessitate a reassessment of the partition point due to this parameter's significant effect on the partition point selection. However, a substantially larger change of another parameter may be necessary to have a significant effect on the partition point selection. As such, each threshold associated with a particular parameter can be different and reflective of that parameter's impact on the selection of the partition point.

Figure 4:
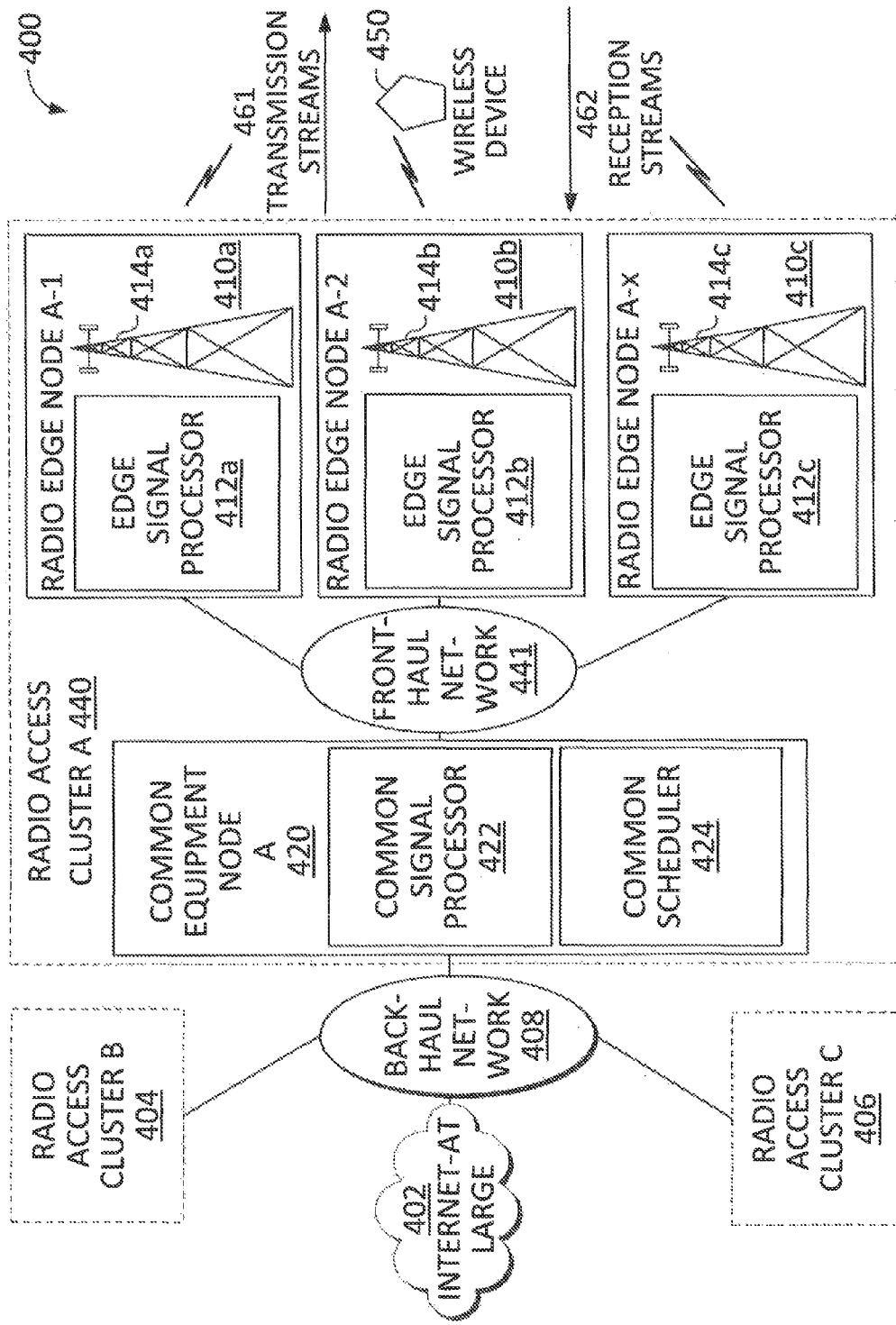
FIG. 4 illustrates a communication network to which embodiments of the present invention can be applied.

Referring to FIG. 4, there is shown an embodiment of a wireless network 400 to which aspects of the present disclosure may apply. The wireless network 400 comprises a backhaul network 408 which communicatively couples together a first radio access cluster A 440, a second radio access cluster B 404, a third radio access cluster C 406, and a data network 402 such as the internet which may be access through a gateway (not shown). Wireless network 400 may, for example comprise a radio access network, while clusters 440, 404, 406 may comprise radio access clusters, within which wireless device 450 may communicate via uplink reception streams 462 and downlink transmission streams 461. Hereinafter, first cluster 440 will be referred to as radio access cluster 440.

Radio access cluster 440 comprises a fronthaul network 441, which communicatively couples a common equipment node 420 to radio edge nodes 410a, 410b, 410c. Accordingly, radio access cluster 440 may substantially comprise the communications network 100 of FIG. 1, with the common equipment node 420 representing the base node 120, radio edge nodes 410a, 410b, 410c representing the edge nodes 110a, 110b, 110c, and the fronthaul network 441 representing the intermediate network 115, and thus radio access cluster 440 may perform any and all operations described above with respect to the communications network of FIG. 1.

Still referring to FIG. 4, common equipment node 420 comprises a common signal processor 422, for performing functions such as at least one of signal processing functions 210, 220, 230, 240 of FIG. 2A, and a common scheduler 424 for scheduling transmissions, such as between a wireless device 450 and radio edge nodes 410a, 410b, 410c, or between radio edge nodes 410a, 410b, 410c and common equipment node 420. Each of the radio edge nodes 410a, 410b, 410c comprises edge signal processors 412a, 412b, 412c coupled to RF Antennas 414a, 414b, 414c, respectively. Each of the edge signal processors 412a, 412b, 412c performs at least one of the signal processing functions 210, 220, 230, 240 of FIG. 2A. Moreover, it is understood that signal processing capabilities of edge signal processors 412a, 412b and 412c are dependent on the configuration of specific edge signal processor and may be configured to be the same, or can be configured to be different. Furthermore, in some embodiments, the signal processing capabilities of a common signal processor or an edge signal processor may change, for example by the instantiation of different virtual signal processing functions on an as-needed basis, which may be realized as VNFs within a NFV framework.

Although FIG. 4 depicts a particular embodiment of the wireless network 400 and radio access cluster 440, these may differ in other embodiments. For example, radio access cluster 440 may comprise any number of radio edge nodes, and each radio edge node may comprise more than one RF Antenna coupled to a respective edge signal processor. In other embodiments, there may be additional processing nodes between the common equipment node A 420 and the radio edge nodes. In such a case, partitioning of the signal processing chain may be done so that portions of the processing can be done at these additional processing nodes. To accommodate this, multiple partition points can be made. It is not necessary for any node participating in the signal processing chain to be aware of which functions are being performed at the other nodes. These variations are all contemplated within the present disclosure.

Figure 5A:
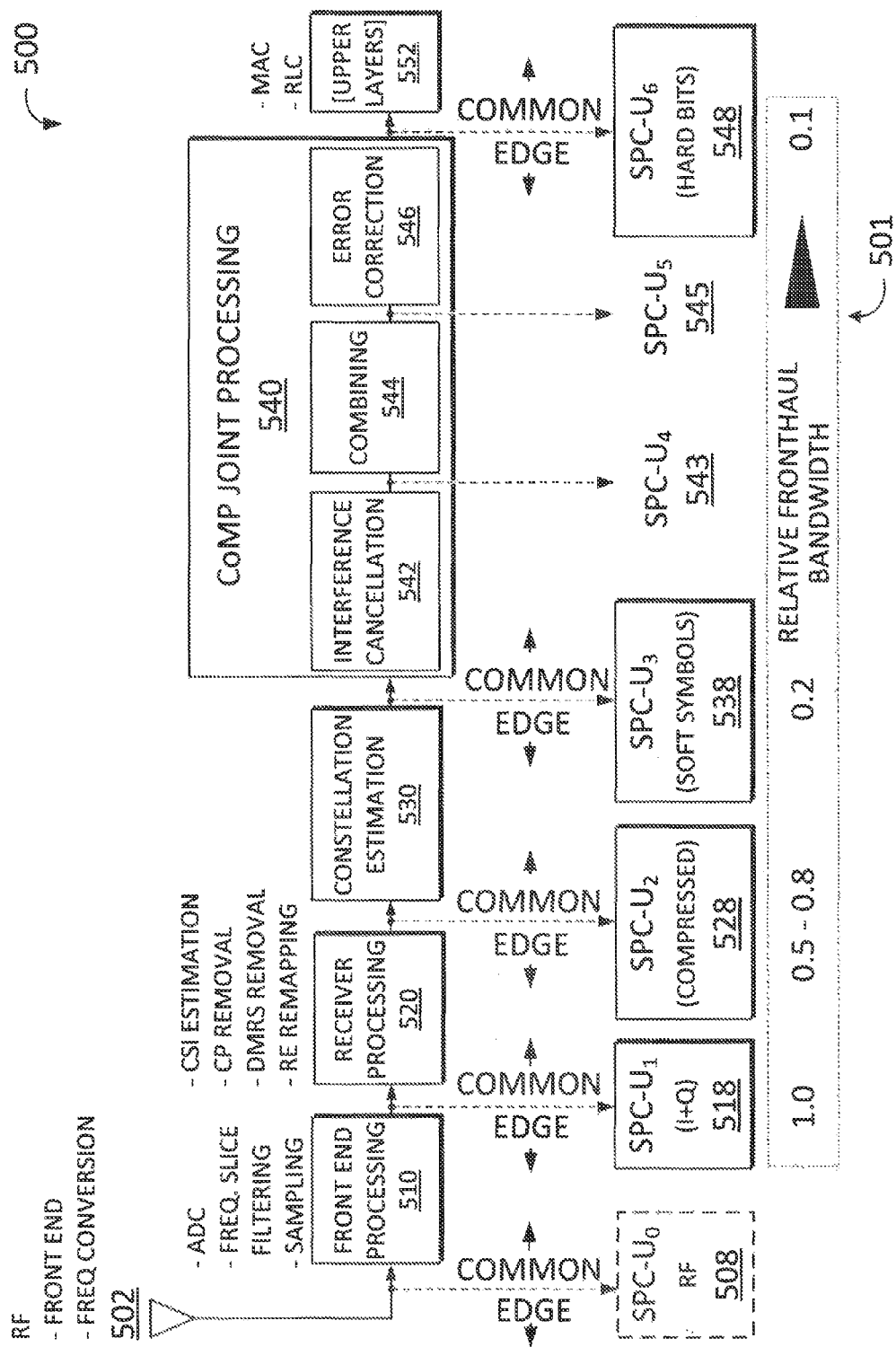
FIG. 5A illustrates a reception signal processing chain in accordance with embodiments of the present invention.

Referring to FIG. 5A, there is shown an embodiment of a multi-point reception signal processing chain 500, as might be used to process signals received in the uplink direction. This signal processing chain indicates a sequence of individual signal processing functions 510, 520, 530, 540 that may be applied to an input signal 502 received by the radio access cluster 440 of FIG. 4, or the communications network 100 of FIG. 1. The multi-point reception signal processing chain 500 may be used for example, when implementing a multi-point joint processing scheme such as CoMP.

As shown in FIG. 5A, multi-point reception signal processing chain 500 comprises a first signal processing function (front end processing) 510, a second signal processing function (receiver processing) 520, a third signal processing function (constellation estimation) 530, and a fourth signal processing function (CoMP joint processing) 540. Accordingly multi-point reception signal processing chain 500 is similarly structured to the signal processing chain 200 of FIG. 2A, except that fourth signal processing function 540 further comprises a first sub-function (interference cancellation) 542, a second sub-function (combining) 544, and a third sub-function (error correction) 546. Partition points 508, 518, 528, 538, 548, and sub-partition points 543, 545, are dispersed between signal processing functions 510, 520, 530, 540, and sub-functions 542, 544, 546, respectively, in order to separate the functions (or separate between the sub-functions) into a first stage of signal processing functions and second stage of signal processing functions, similar to that described for signal processing chain 200 of FIG. 2A.

In the depicted embodiment, the first signal processing function 510 comprises front end signal processing which may include analog to digital conversion, frequency slice filtering and sampling, the second signal processing function 520 comprises receiver processing which may include CSI (channel state information) estimation, CP (cyclic prefix) removal, DMRS (demodulation reference signal) removal and RE (resource element) mapping, the third signal processing function 530 comprises constellation estimation, and the fourth signal processing function 540 comprises CoMP joint processing functions. When applied in the radio access cluster 440 of FIG. 4, partition points 508, 518, 528, 538, may be selected such that the CoMP joint processing functions are performed on the common equipment node 420, dependent on uplink or downlink transmissions with wireless device 450. The fourth signal processing function 540, comprising CoMP joint processing functions, further comprises a first sub-function 542 such as interference cancellation, a second sub-function 544 such as combining, and a third sub-function 546 such as error correction.

Figure 5B:
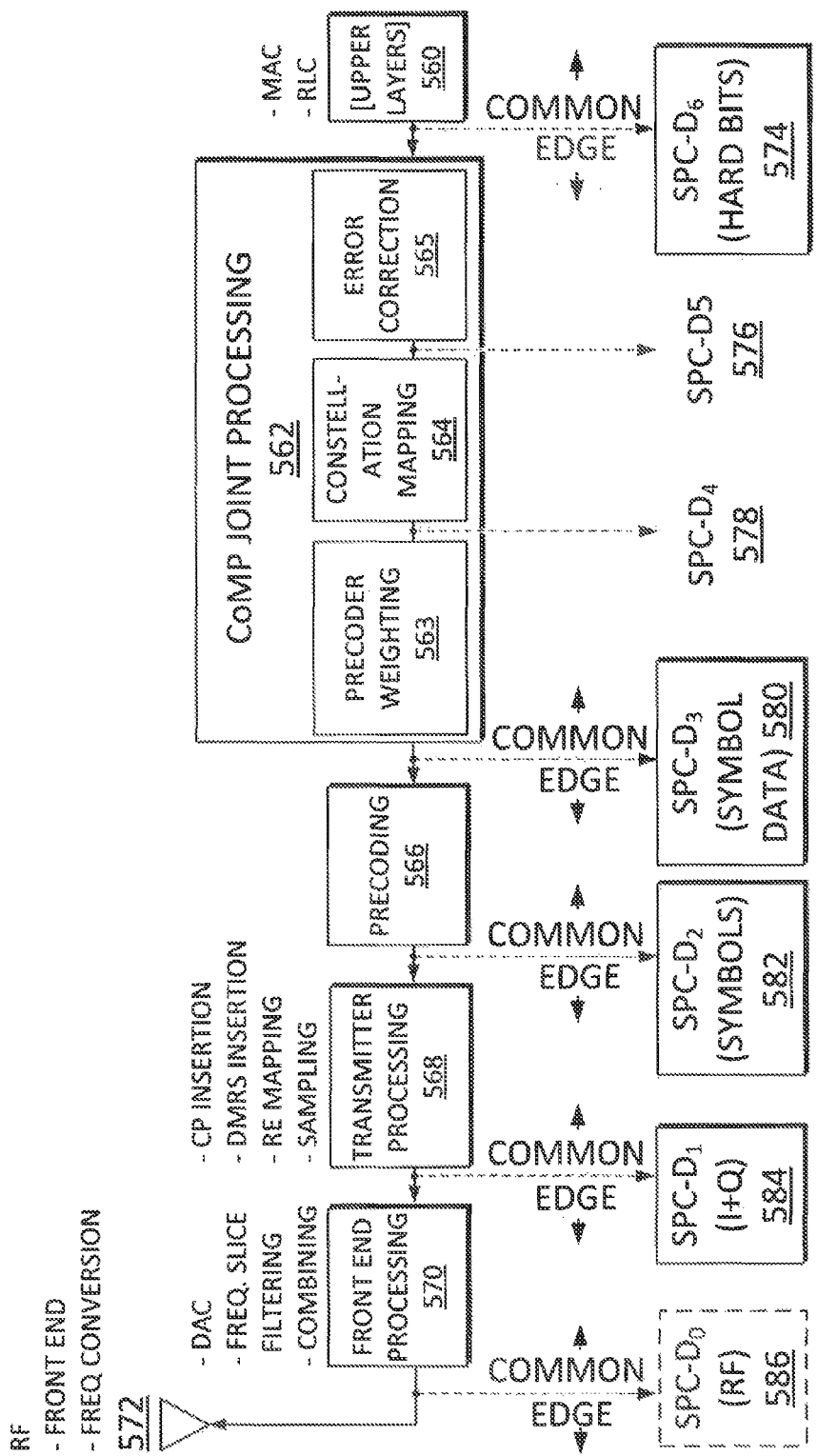
FIG. 5B illustrates a transmission signal processing chain in accordance with embodiments of the present invention.

Similar to signal processing functions of FIG. 2A, the signal processing functions of FIGS. 5A and 5B may be performed entirely by the common equipment node 420, or radio edge nodes 410a, 410b, 410c, or shared between them based on the selection of a partition point. As partitioning and deployment of the multi-point reception signal processing chain operates in substantially the same manner as that of the signal processing chain of FIG. 2A, further discussion is omitted for brevity.

By way of illustration, in the uplink scenario illustrated in FIG. 5A, the impact of each of the signal processing functions on the required bandwidth of the intermediate network for transmitting the intermediate stream to the base node is illustrated. For example, if the edge node solely performs signal processing function 510, the bandwidth required of the intermediate network may be 10 times the bandwidth required if the edge node performs signal processing functions 510, 520, 530 and 540.

Referring to FIG. 5B, there is shown an embodiment of a multi-point transmission signal processing chain as might be used to process signals received in the downlink direction. This signal processing chain indicates a sequence of individual signal processing functions 562, 566, 568, 570 that may be applied to an input signal 560 received from upper layer functions over the backhaul network for example.

As shown in FIG. 5B, multi-point transmission signal processing chain comprises a first signal processing function (CoMP joint processing) 562, a second signal processing function (precoding) 566, a third signal processing function (transmitter processing) 568, and a fourth signal processing function (front end processing) 570. The first signal processing function 562 further comprises a first sub-function (forward error correction) 565, a second sub-function (constellation mapping) 564, and a third sub-function (precoder weighting) 563. Partition points 574, 580, 582, 584, 586, and sub-partition points 576, 578, are dispersed between signal processing functions and sub-functions, respectively, in order to separate the functions (or separate between the sub-functions) into a first stage of signal processing functions and second stage of signal processing functions. For example, transmitter processing 568 can include CP insertion, DMRS insertion, RE mapping and sampling, while front end processing 570 can include digital to analog conversion, frequency slice filtering and combining.

The following examples highlight additional methods for processing an input signal with the wireless network of FIG. 4, according to the multi-point reception signal processing chain of FIG. 5A. Moreover, these methods also apply for processing an input signal with the wireless network of FIG. 4 according to multi-point transmission signal processing chain of FIG. 5I. However, these methods may also apply to the communications network of FIG. 1 using the signal processing chain of FIG. 2A, or further apply to other suitable networks using other suitable signal processing chains, in additional embodiments (not shown).

Dynamic Partition Point Reassessment

Figure 6:
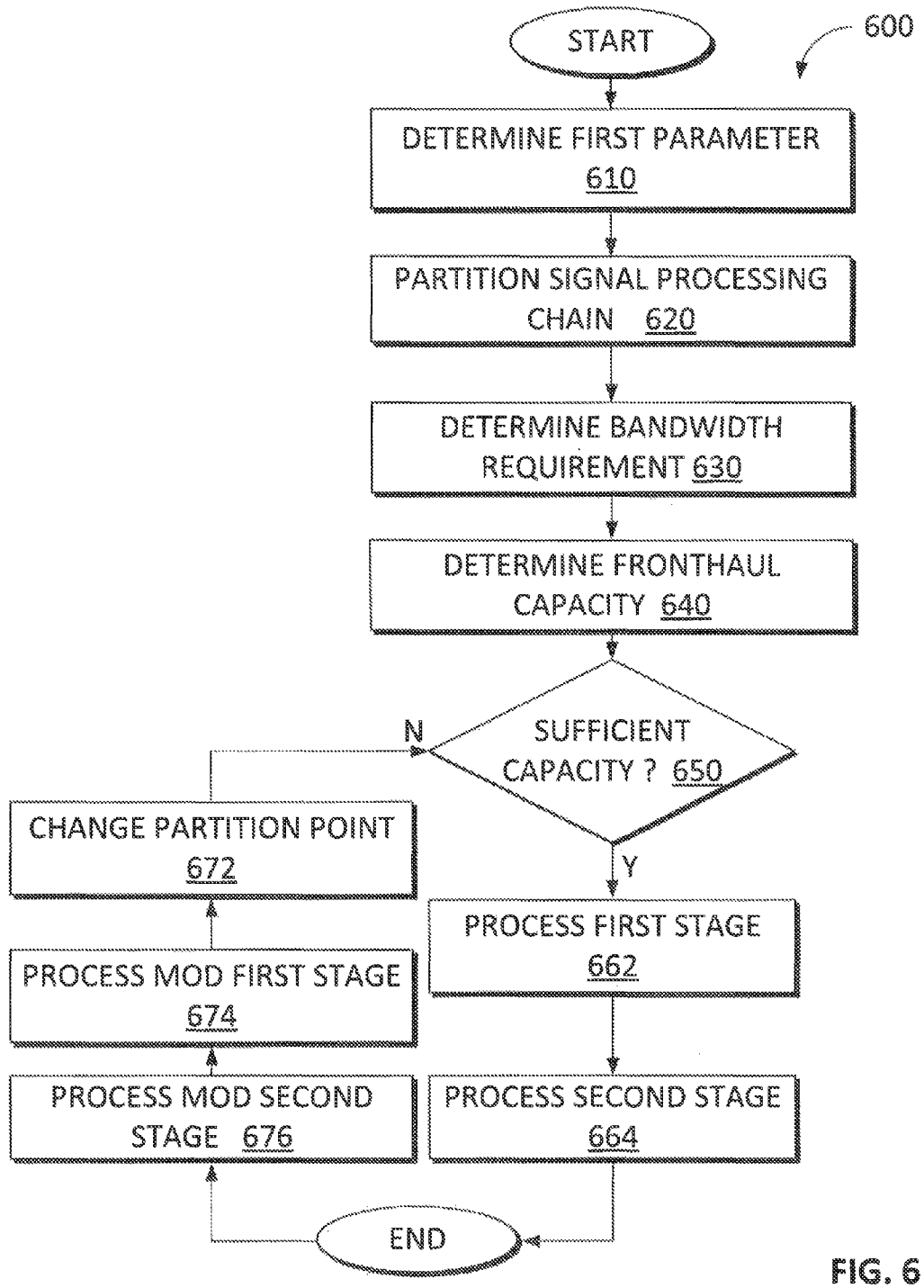
FIG. 6 illustrates a flow chart illustrating a method for determination of a first stage of signal processing functions and second stage of signal processing functions according to embodiments of the present invention.

Referring to FIG. 6, there is shown a flow chart of a method 600 for processing an input signal with a common equipment node and/or at least a radio edge node in the wireless network 400 of FIG. 4, according to an embodiment of the present invention.

At step 610, a first parameter indicative of a current state of the input signal or wireless network is determined. At step 620, a partition point of the signal processing chain is determined thereby separating the signal processing functions into a first stage of signal processing functions and a second stage of signal processing functions based on the first parameter. At step 630, a bandwidth requirement for a partially processed stream at the determined partition point is determined. At step 640, the available capacity of the front haul network is determined.

At step 650, if the available capacity of the fronthaul network meets or exceeds the bandwidth requirement, then at step 662, the input signal is processed with the first stage of signal processing functions at one of the common equipment node or the at least one radio edge node to yield an intermediate stream; and at step 664, the intermediate stream is processed with the second stage of signal processing functions at the other of the common equipment node or the at least one edge node.

Otherwise, if the available capacity of the fronthaul network does not meet the bandwidth requirement, then at step 672, the partition point of the signal processing chain is modified based on the available capacity of the fronthaul network to separate the signal processing functions into a modified first stage of signal processing functions and a modified second stage of signal processing functions. At step 674, the input signal is processed with the modified first stage of signal processing functions at one of the common equipment node or the at least one radio edge node to yield a modified stream. Finally at step 676, the modified stream is processed with the modified second stage of signal processing functions at the other of the common equipment node or the at least one radio edge node.

The first parameter may be indicative of the signal to interference and noise ratio (SINR) of the input signal, the signal processing functional requirements for the input signal, the signal processing capacity of the common equipment node or the at least one radio edge node, or other suitable parameter which may have an impact on the determination of the partition point of the signal processing chain for separation of the signal processing functions.

In some embodiments, for the method illustrated in FIG. 6, a latency threshold or latency requirement for the intermediate stream may be used as an evaluation parameter for the current operational characteristics of the fronthaul network, namely a perceived latency of the fronthaul network, instead of a bandwidth requirement. For example, if the perceived latency exceeds the latency requirement, the partition point of the signal processing chain is modified based on the perceived latency of the fronthaul network to separate the signal processing functions into a modified first stage of signal processing functions and a modified second stage of signal processing functions. In other embodiments, an evaluation parameter based on a combination of the fronthaul network's available bandwidth and currently experienced latency or perceived latency may be used.

Figure 7:
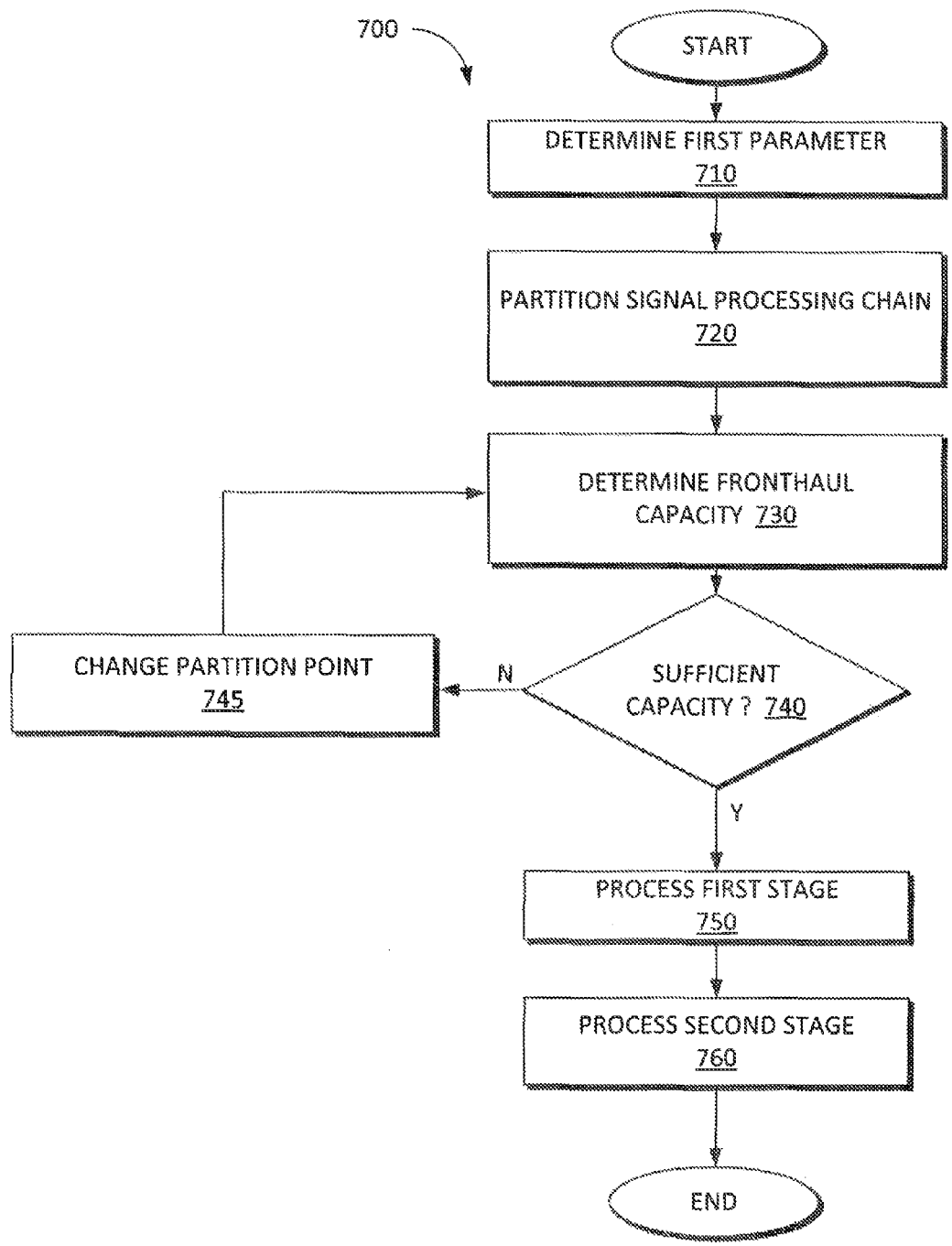
FIG. 7 illustrates a flow chart illustrating a method for determination of a first stage of signal processing functions and second stage of signal processing functions according to embodiments of the present invention.

Referring to FIG. 7, there is shown a flow chart of a method 700 for processing an input signal with a common equipment node and/or at least a radio edge node in the wireless network of FIG. 4, according to an embodiment of the present invention.

At step 710, a first parameter indicative of a current state of the input signal or wireless network is determined. This may comprise, for example the SINR of the input signal.

At step 720, a partition point of the signal processing chain is determined for separating the signal processing functions into a first stage of signal processing functions and a second stage of signal processing functions based on the first parameter. As discussed above, selection of the partition point will result in an intermediate stream that is to be transmitted between the common equipment node and at least one radio edge node.

At step 730, the available capacity of the front haul network is determined. At step 740, if the fronthaul network has sufficient capacity available for transmitting the intermediate signal, for example, based on its expected bandwidth, then at step 750, the input signal is processed with the first stage of signal processing functions at one of the common equipment node or the at least one radio edge node to yield the intermediate stream, and at step 760, the intermediate stream is processed with the second stage of signal processing functions at the other of the common equipment node or the at least one edge node.

If at step 740, it is determined that the fronthaul network does not have sufficient capacity available to transmit the intermediate signal, then at step 745 the partition point of the signal processing chain is changed for the input signal. The criteria for changing the partition point may comprise the SINR of the input signal, the quality of service (QoS) associated the input signal, the priority of the input signal or wireless device, and the processing capabilities and capacities of the common equipment node and the at least one radio edge node. The method then loops back to step 730 and checks the available capacity of the intermediate network, and repeats the subsequent steps defined above. This embodiment is similar to that as illustrated in FIG. 6, however, repartitioning of the signal processing chain may be performed independent of the determined available capacity or perceived latency of the intermediate network, as the evaluation of available intermediate network capacity is performed subsequent to the repartitioning process.

Figure 8:
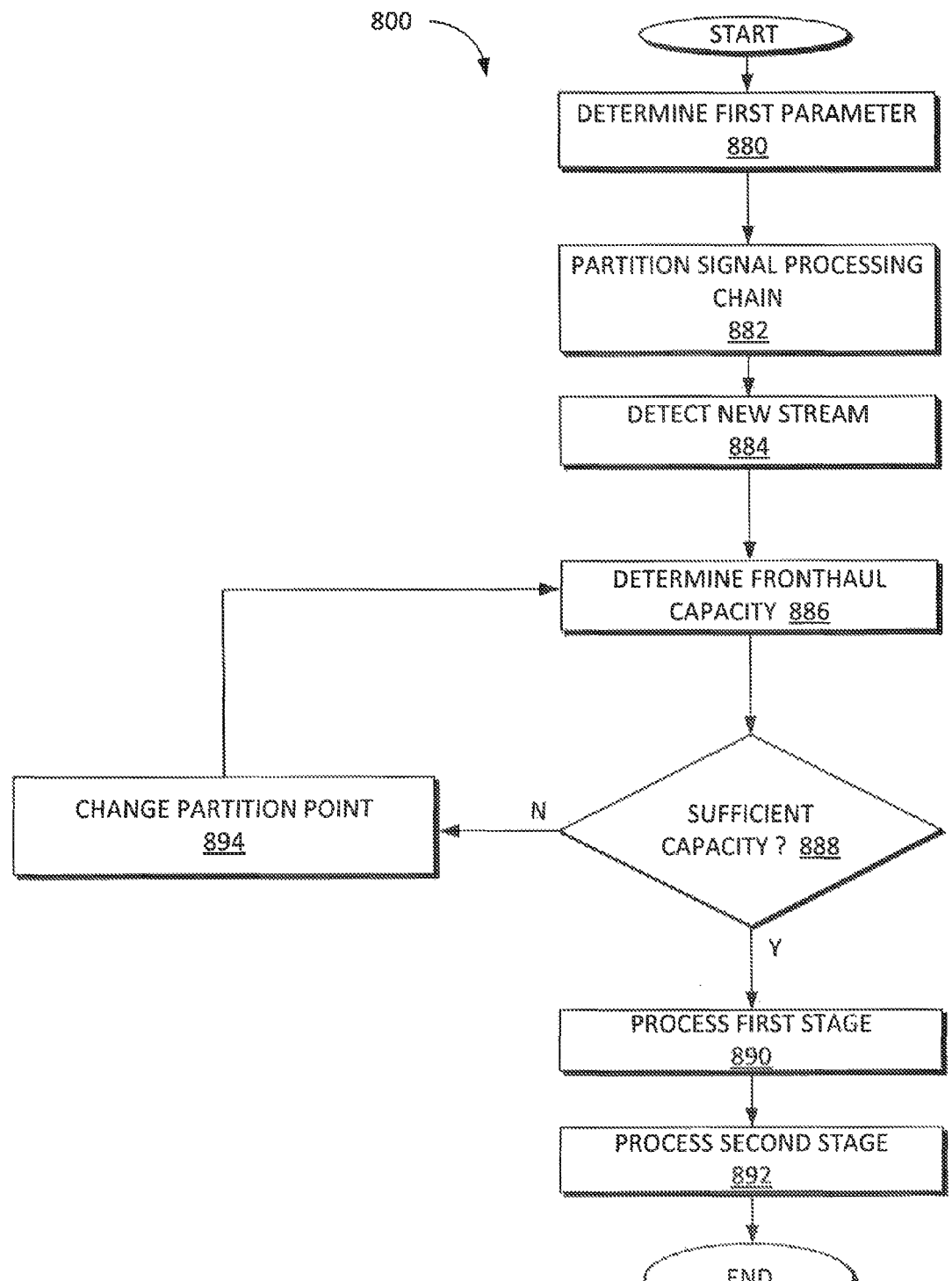
FIG. 8 illustrates a flow chart illustrating a method for determination of a first stage of signal processing functions and second stage of signal processing functions according to embodiments of the present invention.

Referring to FIG. 8, there is shown a flow chart of a method for processing a first input signal with a common equipment node and/or at least a radio edge node, according to an embodiment of the present invention.

At step 880, a first parameter indicative of a current state of the first input signal or wireless network is determined. At step 882, a partition point of the signal processing chain is determined for separating signal processing functions into a first stage of signal processing functions and a second stage of signal processing functions based on the first parameter.

The first input signal is processed with the first stage of signal processing functions at one of the common equipment node or the at least one radio edge node to yield a first intermediate stream and the first intermediate stream is processed with the second stage of signal processing functions at the other of the common equipment node or the at least one radio edge node. At step 884, a second input signal is detected and an associated required fronthaul network capacity is determined based on selection of the partition point of the signal processing chain for the second input signal. Subsequently at step 886 a combined fronthaul network capacity requirement is determined, which may be related to a sum of the required bandwidth of a partially processed stream at the determined partition point for the first input signal and the required bandwidth for the partially processed stream at the determined partition point of the second input signal. At step 886, the available capacity of the front haul network is determined. At step 888, a determination of whether the available capacity of the fronthaul network meets or exceeds the combined fronthaul network capacity requirement is made. If it is determined that there is sufficient capacity, then the process continues to step 890 where the second input signal is processed with the first stage of signal processing functions at one of the common equipment node or the at least one radio edge node to yield a second intermediate stream; and at step 892, the second intermediate stream is processed with the second stage of signal processing signals at the other of the common equipment node or the at least one edge node.

If at step 888, it is determined that the fronthaul network does not have sufficient capacity available to provide the required combined fronthaul network capacity requirement for the first and second intermediate streams, then at step 894 the partition point is changed for the first input signal. The method then loops back to step 886 and checks the available capacity of the intermediate network, and repeats the subsequent steps defined above. One skilled in the art will appreciate that in some embodiments, changing the partition point in step 894 can be done to ensure sufficient fronthaul capacity so long as the change does not result in other thresholds being violated.

This embodiment is similar to that as illustrated in FIG. 7, however, repartitioning of the signal processing chain may be performed on a first input signal based on requirements of a second input signal. The criteria for changing the partition point of the first input signal rather than the partition point of the second input signal may comprise the SINR of the respective input signals, the quality of service (QoS) associated with the respective input signals, the priority of the respective input signals or wireless devices, and the processing capabilities and capacities of the common equipment node and the at least one radio edge node. For example and having further regard to FIG. 8, at step 894, the partition point of the signal processing chain associated with the second input signal is changed, if the first input signal has a higher priority than the second input signal.

Figure 9:
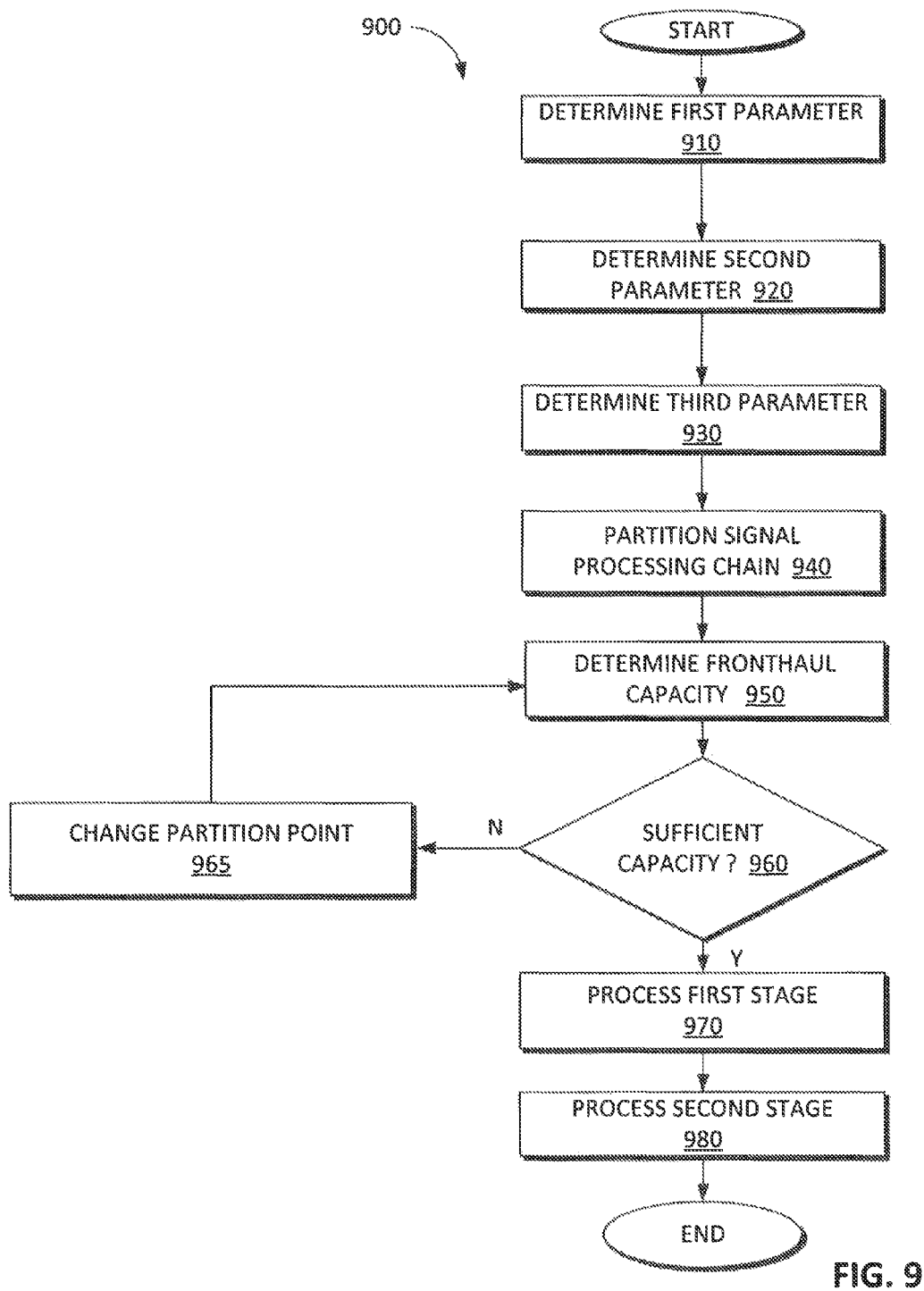
FIG. 9 illustrates a flow chart illustrating a method for determination of a first stage of signal processing functions and second stage of signal processing functions according to embodiments of the present invention.

Referring to FIG. 9, there is shown a flow chart of a method 900 for processing an input signal with a common equipment node and/or at least a radio edge node in the wireless network 400 of FIG. 4, according to an embodiment of the present invention.

At step 910, a first parameter network indicative of a current state of the input signal or wireless network is determined. This may comprise, for example the SINR of input signal. At step 920, a second parameter indicative of a current state of the input signal or wireless network is determined. This may comprise, for example the signal processing requirements for the input signal. At step 930, a third parameter indicative of a current state of the input signal or wireless network is determined. This may comprise, for example an evaluation of the signal processing capabilities of the at least one radio edge node.

At step 940, a partition point of the signal processing chain is determined for separating the signal processing functions into a first stage of signal processing functions and a second stage of signal processing functions based on the first, second, and third parameters. As discussed above, the determination of an appropriate partition point can be calculated taking into account the relative importance of the first, second and third parameters, wherein the most important parameter can have the most significant impact. As noted above, in this embodiment, weighting factors or functions can be associated with each parameter, wherein each weighting function or factor is indicative of the importance of the parameter. Also as discussed above, selection of the partition point will result in an intermediate stream that is to be transmitted between the common equipment node and at least one radio edge node.

At step 950, the available capacity of the front haul network is determined. At step 960, if the fronthaul network has sufficient capacity available for transmitting the intermediate signal, for example, based on its expected bandwidth, then at step 970, the input signal is processed with the first stage of signal processing functions at one of the common equipment node or the at least one radio edge to yield the intermediate stream, and at step 980, the intermediate stream is processed with the second stage at the other of the common equipment node or the at least one edge node.

If at step 960, the fronthaul network does not have sufficient capacity available to transmit the intermediate signal, then at step 965 the partition point is changed for the input signal. The criteria for changing the partition point may comprise the SINR of the input signal, the quality of service (QoS) associated with the input signal, the priority of the input signal or wireless device, and the processing capabilities and capacities of the common equipment node and the at least one radio edge node. The method then loops back to step 950 and repeats the subsequent steps defined above.

As noted from the above embodiments, the partitioning of signal processing chain, based on at least a first parameter indicative of the current state of a stream or input signal or the network, allows for dynamic separation of the signal processing chain into first and second stages of signal processing functions in order to improve signal processing versatility of the network. In some embodiments, certain network characteristics may be alleviated, improved, or optimized. For example, embodiments of the present disclosure may result in lower fronthaul network capacity demands, which could result in lower fronthaul network costs. Further, embodiments of the present disclosure may permit more flexible management of fronthaul network capacity, for example, according to transmission requirements of individual streams. Resource costs of the radio edge nodes may also be reduced by allocating signal processing functions to the common equipment node on an as-needed basis, for example, during traffic peaks. Signal processing requirements for a given stream may be matched to network nodes based on their capacity or capability. Accordingly, these features may help reduce resource costs while improving network efficiency.

Although the present disclosure has been described with reference to specific embodiments, aspects, and features thereof, it is evident that various modifications and combinations can be made thereto without departing from the scope of the disclosure. For example, the described methods may apply to either uplink or downlink transmissions between the base node and edge nodes, or between the common equipment node and radio edge nodes. Moreover, first stage of signal processing functions and second stage of signal processing functions may be performed on either of the base node or outer nodes dependent on uplink or downlink transmissions. Also, signal processing chains may vary in the number of individual signal processing functions in different embodiments, with corresponding partition points. Accordingly, the specification and drawings are to be regarded simply as an illustration of the innovation as defined by the appended claims, and are contemplated to cover any and all modifications, variations, combinations or equivalents that fall within the scope of the present disclosure.

In addition, according to embodiments, edge nodes and/or base nodes can be configured with sufficient functionality in order to enable Network Function Virtualization (NFV), wherein virtualized signal processing functions are capable of running over the NFV infrastructure. As such, virtual signal processing functions may be instantiated on an as-needed basis using available node resources. Accordingly, depending on the configuration of the communication network, one or more of the signal processing functions can be configured as a virtualized network function, thereby providing the instantiation and placement of the particular signal processing function at a desired location, which may also influence the determination of the partition point of the signal processing chain.

Aspects or embodiments of the present disclosure may also be implemented by using hardware only, or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include number of statements and instructions that enable a computer device to execute operations for configuring or programming a digital logic apparatus in accordance with embodiments of the present disclosure.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for processing an input signal in a communication network, the method comprising:
   determining a first parameter indicative of a current state of the input signal or communication network;
   partitioning a signal processing chain which includes plural signal processing functions, into an initial first stage of signal processing functions and an initial second stage of signal processing functions based on the first parameter, wherein processing of the input signal using the initial first stage of signal processing functions yields an initial intermediate signal;
   repartitioning the signal processing chain into a first stage of signal processing functions and a second stage of signal processing functions in accordance with a determination that a fronthaul network capacity is insufficient to transmit the initial intermediate signal.

2. The method of claim 1 further comprising transmitting instructions to process the input signal with the first stage of signal processing functions to yield an intermediate signal.

3. The method of claim 2 further comprising transmitting instructions to process the intermediate signal with the second stage of signal processing functions.

4. The method of claim 1 wherein the first parameter is indicative of a signal to interference plus noise ratio (SINR) of the input signal.

5. The method of claim 3 wherein the first parameter is indicative of a traffic load on an intermediate network communicatively connecting a base node and at least one edge node.

6. The method of claim 3 wherein the first parameter is indicative of a signal processing load at a base node or at least one edge node.

7. The method of claim 3 wherein the first parameter is indicative of signal processing capability at a base node or at least one edge node.

8. The method of claim 1 wherein the first parameter is indicative of the signal processing functions required for the input signal.

9. The method of claim 1 further comprising determining a second parameter indicative of the current state of the input signal or communication network, wherein the signal processing chain is partitioned into the first stage of signal processing functions and the second stage of signal processing functions based on the first parameter and the second parameter.

10. The method of claim 1 further comprising monitoring a second parameter indicative of the current state of the input signal or the communication network, and if the second parameter has changed a predetermined amount:
   repartitioning the signal processing chain into a modified first stage of signal processing functions and a modified second stage of signal processing functions based on the second parameter.

11. The method of claim 2 wherein prior to transmitting instructions to process the input signal, performing the following:
   determining a latency requirement for transmitting the intermediate stream;
   determining a fronthaul network perceived latency;
   in accordance with a determination that the determined perceived latency exceeds the determined latency requirement, modifying the partition point of the signal processing chain based on the fronthaul network perceived latency to separate the signal processing functions into a modified first stage of signal processing functions and a modified second stage of signal processing functions.

12. The method of claim 1 wherein the signal processing chain is repartitioned due to arrival of a new input signal, departure of a stream, equipment failure or a change in edge node.

13. The method of claim 1, wherein arrival of a second input signal results in partitioning of a second signal processing function chain associated with the second input signal.

14. The method of claim 13, wherein if repartitioning of the signal processing chain or the second signal processing chain is required, the signal processing chain is repartitioned when the second input signal has a higher priority than the input signal.

15. A communication network comprising:
   at least one edge node;
   a base node coupled to the at least one edge node; and
   a processor configured to partition a signal processing chain which includes plural signal processing functions, into an initial first stage of signal processing functions and an initial second stage of signal processing functions according to a first parameter indicative of a current state of an input signal or communication network, the processor further configured to repartition the signal processing chain into a first stage of signal processing functions and a second stage of signal processing functions in accordance with a determination that a fronthaul network capacity is insufficient to transmit the initial intermediate signal, wherein the first stage of signal processing functions is performed by one of the at least one edge node or the base node receiving the input signal and thereby yielding an intermediate signal, and the second stage of signal processing functions is performed by the other of the at least one edge node or the base node on the intermediate signal.

16. The communication network of claim 15 wherein the first parameter is indicative of a signal to interference plus noise ratio (SINR) of the input signal.

17. The communication network of claim 15 wherein the base node and the at least one edge node are communicatively connected by an intermediate network and the first parameter is indicative of a traffic load on the intermediate network.

18. The communication network of claim 15 wherein the processor is configured with one or more virtualized signal processing functions.

* * * * *

UNITED STATES PATENT AND TRADEMARK OFFICE
CERTIFICATE OF CORRECTION

PATENT NO. : 9,876,585 B2  
APPLICATION NO. : 14/791354  
DATED : January 23, 2018  
INVENTOR(S) : William Anthony Gage Page 1 of 1

It is certified that error appears in the above-identified patent and that said Letters Patent is hereby corrected as shown below:

In the description:

Column 5, Line 57 "110 b" should read --110b--

Column 10, Line 37 "fir example" should read --for example--

Column 16, Line 13 "Fig. 51" should read --Fig. 5B--

Signed and Sealed this  
Tenth Day of April, 2018

Andrei Iancu  
*Director of the United States Patent and Trademark Office*